US009208118B2

(12) United States Patent
Lee et al.

(10) Patent No.: US 9,208,118 B2
(45) Date of Patent: Dec. 8, 2015

(54) COMMUNICATION DEVICE, A METHOD OF PROCESSING SIGNAL IN THE COMMUNICATION DEVICE AND A SYSTEM HAVING THE COMMUNICATION DEVICE

(75) Inventors: Uee Song Lee, Seoul (KR); Won-Bin Jang, Seoul (KR); Jong Pil Won, Seoul (KR); Jung Su Lee, Seoul (KR); Ju Ho Ha, Seoul (KR); Kyung Hwan Kim, Suwon-si (KR)

(73) Assignee: LG Electronics Inc., Seoul (KR)

( * ) Notice: Subject to any disclaimer, the term of this patent is extended or adjusted under 35 U.S.C. 154(b) by 547 days.

(21) Appl. No.: 12/329,222

(22) Filed: Dec. 5, 2008

(65) Prior Publication Data
US 2009/0307380 A1    Dec. 10, 2009

(30) Foreign Application Priority Data
Jun. 10, 2008 (KR) .......................... 10-2008-0054340

(51) Int. Cl.
*G06F 3/00* (2006.01)
*G06F 13/38* (2006.01)

(52) U.S. Cl.
CPC .................................. *G06F 13/387* (2013.01)

(58) Field of Classification Search
None
See application file for complete search history.

(56) References Cited

U.S. PATENT DOCUMENTS

| 6,003,135 | A * | 12/1999 | Bialick et al. ................. 726/29 |
| 7,213,766 | B2 * | 5/2007 | Ryan et al. .................... 235/492 |
| 7,296,165 | B2 * | 11/2007 | Feldstein et al. .............. 713/300 |
| 7,536,486 | B2 * | 5/2009 | Sadovsky et al. ................ 710/11 |
| 7,570,761 | B2 * | 8/2009 | Risan et al. ................... 380/201 |
| 7,933,448 | B2 * | 4/2011 | Downs, III .................... 382/181 |
| 8,150,452 | B2 * | 4/2012 | Liang ......................... 455/550.1 |
| 2002/0046342 | A1 * | 4/2002 | Elteto et al. ................... 713/185 |
| 2002/0065083 | A1 * | 5/2002 | Patel ............................ 455/452 |
| 2002/0069252 | A1 * | 6/2002 | Jones et al. .................... 709/206 |
| 2002/0188789 | A1 * | 12/2002 | Kim et al. ..................... 710/305 |
| 2003/0005278 | A1 * | 1/2003 | Deng et al. ....................... 713/2 |
| 2003/0018836 | A1 * | 1/2003 | Bress et al. .................... 710/16 |
| 2003/0028693 | A1 * | 2/2003 | Pasumansky et al. ......... 710/105 |
| 2003/0233589 | A1 * | 12/2003 | Alvarez ........................ 713/300 |
| 2004/0133794 | A1 * | 7/2004 | Kocher et al. ................. 713/193 |
| 2004/0266480 | A1 * | 12/2004 | Hjelt et al. .................... 455/558 |

(Continued)

FOREIGN PATENT DOCUMENTS

JP          2007-43243 A       2/2007
KR    10-2007-0006317 A       1/2007

(Continued)

*Primary Examiner* — Henry Tsai
*Assistant Examiner* — Christopher Bartels
(74) *Attorney, Agent, or Firm* — Birch, Stewart, Kolasch & Birch, LLP

(57) ABSTRACT

A mobile terminal including an interface module configured to connect the mobile terminal to a personal computer; a communication unit configured to communicate with the personal computer via a first communication mode, a controller configured to selectively transmit a communication mode change program to the personal computer via the interface module, the communication mode change program instructing the personal computer to communicate with the mobile terminal via a second communication mode that is different than the first communication mode, and a receiving unit configured to receive a mode change instruction from the personal computer instructing the mobile terminal to communicate with the personal computer via the second communication mode.

12 Claims, 12 Drawing Sheets

(56) References Cited

U.S. PATENT DOCUMENTS

| | | | |
|---|---|---|---|
| 2005/0076209 A1* | 4/2005 | Proudler | 713/165 |
| 2005/0083741 A1* | 4/2005 | Chang et al. | 365/200 |
| 2005/0102178 A1* | 5/2005 | Phillips et al. | 705/14 |
| 2005/0165784 A1* | 7/2005 | Gomez et al. | 707/9 |
| 2005/0236491 A1* | 10/2005 | Leaming | 235/492 |
| 2006/0026304 A1* | 2/2006 | Price | 710/8 |
| 2006/0059496 A1* | 3/2006 | Joy et al. | 719/310 |
| 2006/0109349 A1* | 5/2006 | Takashima | 348/207.1 |
| 2006/0129855 A1* | 6/2006 | Rhoten et al. | 713/320 |
| 2006/0149858 A1* | 7/2006 | Bhesania et al. | 710/5 |
| 2006/0265539 A1* | 11/2006 | Hua et al. | 710/302 |
| 2007/0083356 A1* | 4/2007 | Brunet et al. | 703/23 |
| 2007/0083604 A1* | 4/2007 | Zimman et al. | 709/207 |
| 2007/0100893 A1* | 5/2007 | Sanders | 707/200 |
| 2007/0124409 A1* | 5/2007 | Sibert | 709/216 |
| 2007/0180509 A1* | 8/2007 | Swartz et al. | 726/9 |
| 2007/0186110 A1* | 8/2007 | Takashima | 713/173 |
| 2007/0204153 A1* | 8/2007 | Tome et al. | 713/164 |
| 2007/0300031 A1* | 12/2007 | Jevans et al. | 711/166 |
| 2008/0027569 A1* | 1/2008 | Okigami | 700/83 |
| 2008/0098478 A1* | 4/2008 | Vaidya et al. | 726/24 |
| 2008/0195790 A1* | 8/2008 | Self | 710/306 |
| 2008/0209199 A1* | 8/2008 | Sadovsky et al. | 713/2 |
| 2008/0240044 A1* | 10/2008 | Khamar | 370/335 |
| 2008/0270410 A1* | 10/2008 | Palnau | 707/10 |
| 2009/0023475 A1* | 1/2009 | Chang et al. | 455/557 |
| 2009/0144510 A1* | 6/2009 | Wibling et al. | 711/147 |
| 2011/0173351 A1* | 7/2011 | Aull et al. | 710/8 |

FOREIGN PATENT DOCUMENTS

| | | |
|---|---|---|
| KR | 10-2007-0109673 A | 11/2007 |
| KR | 10-2008-0020071 A | 3/2008 |

* cited by examiner

| op_code | sub_code | type | reserved | control_byte |

710   720

| local code | name |
|---|---|
| 0x01 | CHANGE_TO_CDC |
| 0x02 | CHANGE_TO_UMS |
| 0x03 | CHANGE_TO_MTP |
| ... | ... |

810
820
830

COMMUNICATION DEVICE, A METHOD OF PROCESSING SIGNAL IN THE COMMUNICATION DEVICE AND A SYSTEM HAVING THE COMMUNICATION DEVICE

This application claims the benefit of Korean Patent Application No. 10-2008-0054340, filed on Jun. 10, 2008, which is hereby incorporated by reference as if fully set forth herein.

BACKGROUND

1. Field

The present application relates to a changing communication modes between a mobile terminal and a personal computer.

2. Discussion of the Related Art

A personal computer (PC) now provides many additional functions. For example, users can access the Internet via their PC, watch movies, listen to music, and perform video calls with other users in addition to performing a wide variety of word processing functions. The PC also allows the user to connect a variety of external devices to the PC such as a memory stick, a video camera, and MP3 player, a mobile phone, etc.

In one example, the PC includes a Universal Serial Bus (USB) port that the user can connect external devices to. The PC then communicates with the external device via the USB port using a USB communication standard. However, changing communication modes between the connected devices is cumbersome for the user.

SUMMARY

Accordingly, one object of the present application is to efficiently change communication modes between a mobile terminal and personal computer.

Another object of the present application is to efficiently change communication modes between a USB device and a USB host.

To achieve these and other advantages and in accordance with the purpose of the present application, as embodied and broadly described herein, the present application provides in one aspect a mobile terminal including an interface module configured to connect the mobile terminal to a personal computer, a communication unit configured to communicate with the personal computer via a first communication mode, a controller configured to selectively transmit a communication mode change program to the personal computer via the interface module, the communication mode change program instructing the personal computer to communicate with the mobile terminal via a second communication mode that is different than the first communication mode, and a receiving unit configured to receive a mode change instruction from the personal computer instructing the mobile terminal to communicate with the personal computer via the second communication mode. Further, the controller is further configured to determine if the personal computer includes the communication mode change program, and to transmit the communication mode change program to the personal computer when the mobile terminal is connected to the personal computer if the controller determines the personal computer does not include the communication mode change program and to automatically execute the communication mode change program on the personal computer when the mobile terminal is connected to the personal computer if the controller determines the personal computer includes the communication mode change program.

In another aspect, the present application provides a personal computer including an interface module configured to connect the personal computer to a mobile terminal, a communication unit configured to communicate with the mobile terminal via a first communication mode, a receiving unit configured to selectively receive a communication mode change program from the mobile terminal via the interface module, the communication mode change program instructing the personal computer to communicate with the mobile terminal via a second communication mode that is different than the first communication mode, and a controller configured to transmit a mode change instruction to the mobile terminal instructing the mobile terminal to communicate with the personal computer via the second communication mode. Further, the controller is further configured to indicate if the personal computer includes the communication mode change program, and to transmit a request to the mobile terminal to request the mobile terminal transmit the communication mode change program to the personal computer when the mobile terminal is connected to the personal computer if the controller indicates the personal computer does not include the communication mode change program, and to automatically execute the communication mode change program on the personal computer when the mobile terminal is connected to the personal computer if the controller indicates the personal computer includes the communication mode change program.

In yet another aspect, the present application provides a method of communication between a mobile terminal and a personal computer, and which includes connecting the mobile terminal to the personal computer, communicating between the mobile terminal and the personal computer via a first communication mode, selectively transmitting a communication mode change program to the personal computer, the communication mode change program instructing the personal computer to communicate with the mobile terminal via a second communication mode that is different than the first communication mode, and receiving a mode change instruction from the personal computer instructing the mobile terminal to communicate with the personal computer via the second communication mode. Further, the mobile terminal determine if the personal computer includes the communication mode change program, and the selectively transmitting step transmits the communication mode change program to the personal computer when the mobile terminal is connected to the personal computer if the mobile terminal determines the personal computer does not include the communication mode change program and automatically executing the communication mode change program on the personal computer when the mobile terminal is connected to the personal computer if the mobile terminal determines the personal computer includes the communication mode change program.

Further scope of applicability of the present application will become apparent from the detailed description given hereinafter. However, it should be understood that the detailed description and specific examples, while indicating preferred embodiments of the application, are given by illustration only, since various changes and modifications within the spirit and scope of the application will become apparent to those skilled in the art from this detailed description.

BRIEF DESCRIPTION OF THE DRAWINGS

The present application will become more fully understood from the detailed description given hereinbelow and the accompanying drawings, which are given by illustration only, and thus are not limitative of the present application, and wherein.

DETAILED DESCRIPTION OF THE INVENTION

Reference will now be made in detail to the preferred embodiments of the present application, examples of which are illustrated in the accompanying drawings. Wherever possible, the same reference numbers will be used throughout the drawings to refer to the same or like parts.

Figure 1:
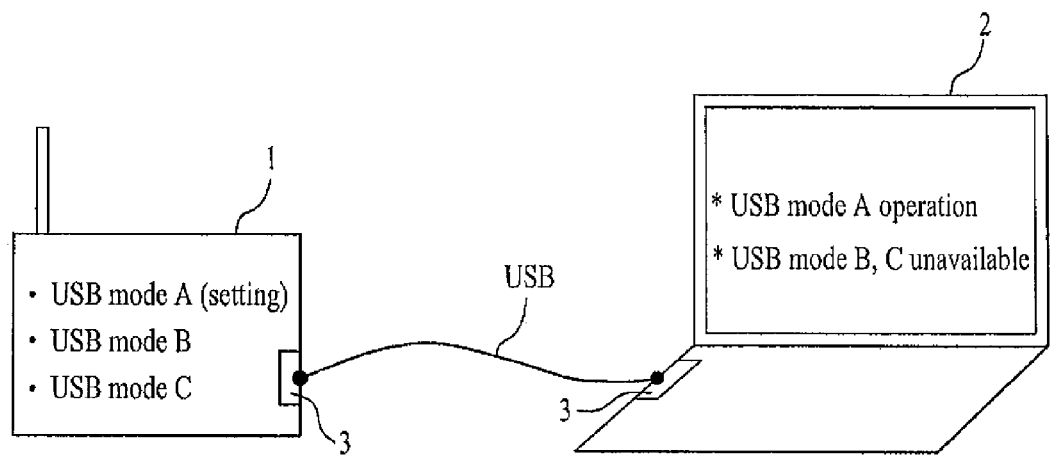
FIG. 1 is an overview illustrating operations between a USB device and a USB host according to an embodiment of the present application.

FIG. 1 is an overview illustrating communication operations between a USB device 1 and a USB host 2 according to an embodiment of the present application. In this embodiment, the USB device 1 is a mobile terminal and the USB host 2 is a laptop computer 2. In addition, as shown in the FIG. 1, the USB device 1 and the USB host 2 include a USB module 3. Thus, the user can connect the USB device 1 to the USB host 2 via the USB port 3 using a USE cable. The USB device 1 and the USB host 2 also communicate using the USB communication standard.

Further, in this embodiment, the USB device 1 supports three USB modes (e.g., USB modes A, B and C). The USB mode A is also set as the default USB mode. That is, when the user connects the USB device 1 (the mobile terminal) to the USB device 2 (the laptop), the initial USB communication mode is the mode A.

In addition, the USB host 2 will view or see the USB device 1 as a certain type of device based on the USB mode. In this embodiment, the USB mode A corresponds to a mass storage device such that the USB host 2 will see the USB device 1 as a mass storage device or memory when the user connects the USB device 1 to the USB host 2. Further, in this embodiment, the USB mode B refers to a communication device such that the USB host 2 will see the USB device 1 as a communication device or modem when the mode B is used and when the user connects the USB device 1 to the USB host 2.

Thus, the user can use their mobile terminal (USB device 1) as a modem to wirelessly connect with the Internet. That is, when the user is at an airport, for example, and wants to connect to the Internet, the user must often pay for Internet Services (BINGO, etc.) provided by the Airport. The user can pay for unlimited Internet use, pay for hourly service, etc. However, according to an embodiment of the present application, the user can connect their cell phone to their laptop and use the cell phone as a modem to access the Internet. Thus, the user does not have to pay an additional service charge for using the Airport provided wireless Internet service or install a separate wireless access card.

In one embodiment, the user can connect the USB device 1 to the USB host 2 and manually change the communication mode to the appropriate communication mode that the user desires (e.g., a communication mode from a memory mode). However, this manual procedure is inconvenient for the user and is particular troublesome for inexperienced users such as elder persons, etc. According to an embodiment of the present application, it is more preferable to allow the user to simply connect their USB device 1 (mobile terminal) to their USB host 2 (laptop), and have the modes changed automatically.

Figure 2:
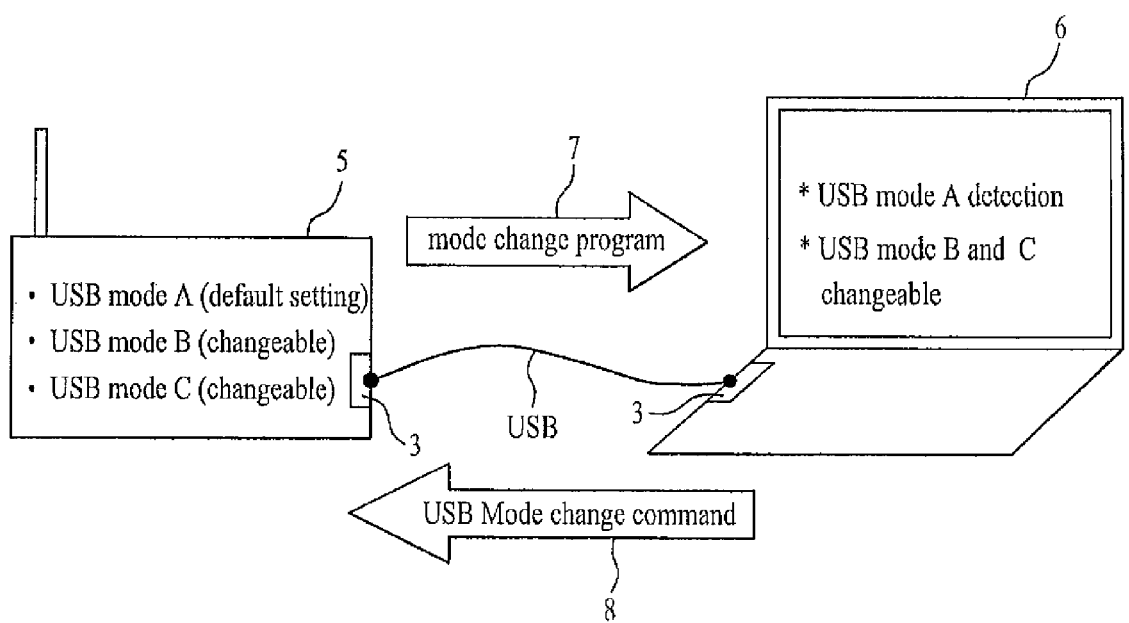
FIG. 2 is another overview illustrating operations between a USB device and a USB host according to an embodiment of the present application.

FIG. 2 is an overview illustrating an embodiment of automatically changing the USB modes between the USB device 1 and the USB host 2. Thus, in this embodiment, the user can simply connect their USB device 1 to the USB host 2 and the modes are automatically changed from the USB mode A (mass storage) to the USB mode B (communication mode).

In more detail, FIG. 2 illustrates the USB device 1 being connected to the USB host 2 via the USB ports 3 and the USB cable. As shown in FIG. 2, the USB mode A is the default setting (similar to the setting in FIG. 1), and the USB modes B and C are changeable modes (different than FIG. 1). Thus, when the user connects the USB device 1 to the USB host 2 using USB modules 3 and the USB cable, the USB host 2 detects the USB mode A in the USB device 1 and operates according to the USB mode A. That is, the USB host 2 recognizes or sees the USB device 2 as a mass storage (memory, CDROM, etc.) device. The mass storage mode is generally the default mode for mobile terminals.

Then, the USB device 1 selectively transmits a software mode change program 7 associated with the USB mode change to the USB host 2. In addition, according to one embodiment of the present application, the USB device 1 automatically transfers the mode change program 7 to the USB host 2 without user intervention. For example, the USB device 1 can determine whether the USB host 2 already includes the mode change program 7 by reviewing a look-up table, for example, and then only transmit the mode change program 7 if the USB host 2 does not include the mode change program 7. Alternatively, in another embodiment, the USB device 1 can prompt the user to determine if the user wants to transfer the mode change program 7 to the USB host 2.

The mode change program 7 is then loaded or installed in the USB host 2. Thereafter, the USB host 2 transmits a USB mode change command 8 to the USB device 1. In one embodiment, the USB host 2 transmits the mode change command 8 to the USB device 2 to change the USE mode A to the USB mode B without user intervention. For example, the USB host 2 can recognize there are new wireless networks available (e.g. when the user enters an airport area, coffee shop, etc.) and then automatically transmit the mode change command 8 by assuming the user has connect their USB device 1 to the USB host 2 to act as a modem for Internet connection. Alternatively, the USB host 2 can prompt the user to determine if the user wants to transmit the mode change command 8 to the USB device 1.

The USB host 2 can also automatically transfer the USB mode command 8 based on different priorities or schedules of the user. For example, the user may connect their mobile terminal to their laptop at a particular time each day for using the wireless Internet. The USB host 2 can then store this information and automatically transmit the mode change command 8 when the user connects their mobile terminal to their laptop at the scheduled time.

Then, when the USB device 1 receives the USB mode change command 8, the USB device 1 changes the USB mode as indicated by the USB mode change command 8. In this example, the USB mode A is changed into the USB mode B. A similar concept applies to changing the USB mode B to the USB mode C, etc. The USB mode command 8 can also request the USB mode B be changed back into the USB mode A.

Thus, according to this embodiment, the user can use their mobile terminal (USB device 1) as a USB mass storage device (USB mode A), as a USB communication device or modem (USB mode B), or as another device (USB mode C). Therefore, the USB modes are easily changed without requiring extensive manual operations from the user.

Figure 3:
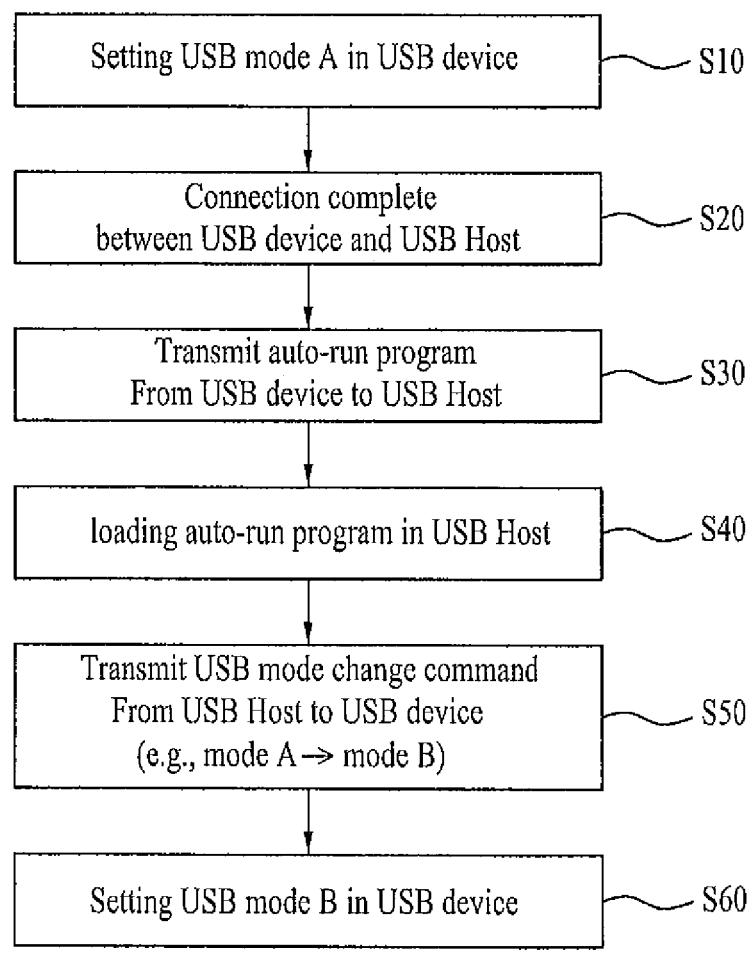
FIG. 3 is a flow chart illustrating a method of communicating between a USB device and a USB host according to a first embodiment of the present application.
Figure 4:
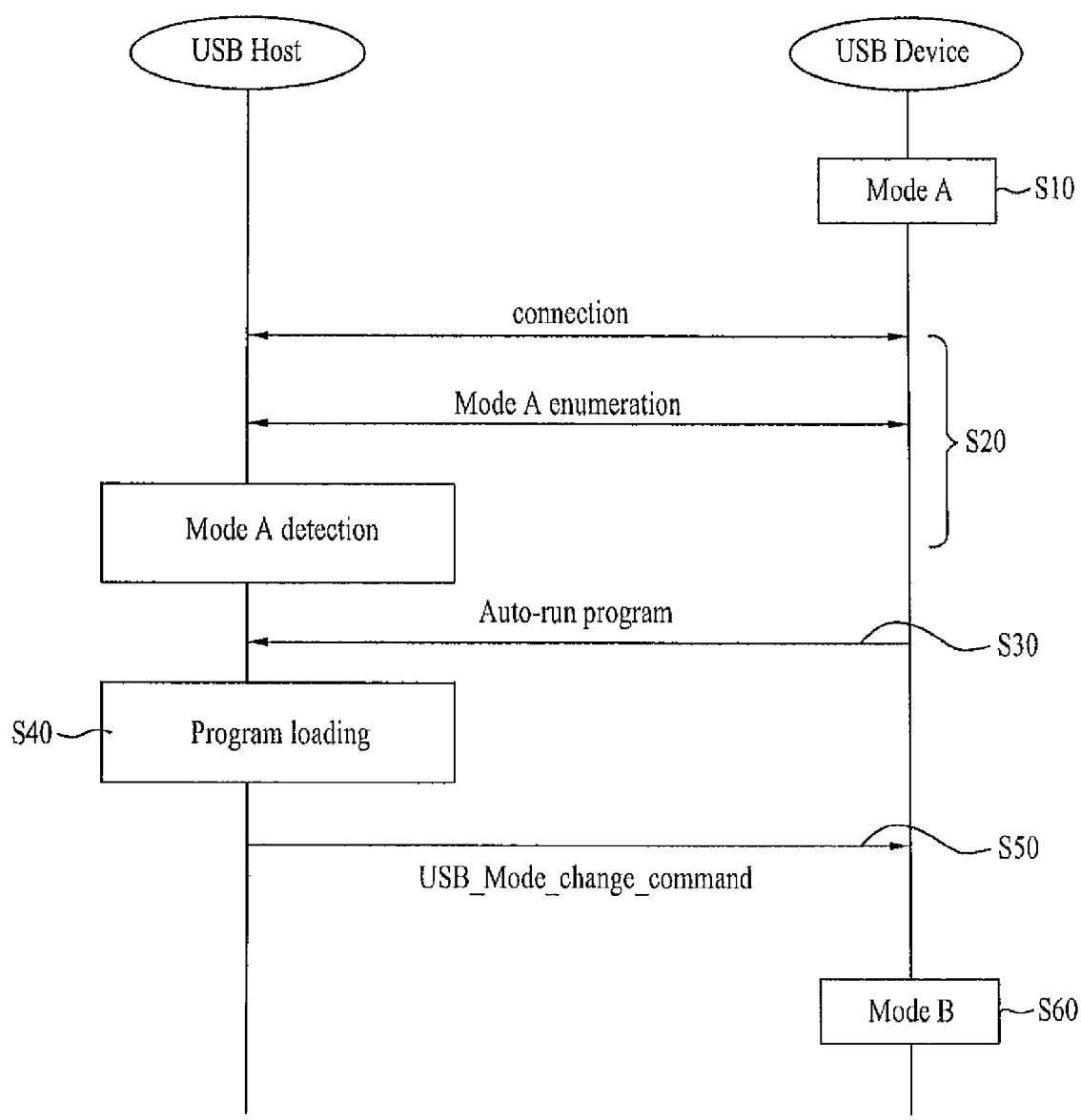
FIG. 4 is a process flow diagram illustrating the method of communicating between the USB device and the USB host according to the first embodiment of the present application.

Next, FIGS. 3 and 4 are a flow chart and process flow diagram, respectively, illustrating the operations of the USB device 1 and the USB host 2 according to the first embodiment. Further, the first embodiment of the present application refers to the USB device as being a mobile terminal, but the present application is applicable to a variety of types of USB devices such as an MP3 Player, etc.

The embodiment shown in FIGS. 3 and 4 also assume the operating mode of the USB device has been initially set to the USB mode A among the variety of USB modes (S10). Then, when the USB device 1 is connected to the USB host 2, the USB host 2 confirms the mode of the USB device 1 as being the USB mode A (S20). This process is referred to as an "enumeration" process in FIG. 4.

In addition, the step S20 in FIG. 4 includes the step of connecting the USB device 1 to the USB host 2 and enumeration process, and the USB host 2 detecting the USB mode of the USB device 1. However, the connection step and the enumeration process can alternatively be performed in one step.

Next, after step S20, the USB device 1 transmits the mode change program 7 to the USB host 2 (S30). As discussed above with respect to FIG. 2, the mode change program 7 can be selectively transmitted to the USB host 2 based on whether the USB host 2 already includes the mode change program 7. Further, the transmitting step S30 and the connection step S20 can be performed independently or simultaneously.

In addition, the USB device 1 can transmit the mode change program 7 in a variety of ways. For example, in the first embodiment, the USB device 1 transmits and installs the program 7 on the USB host 1 using an "auto-run program". That is, the auto-run program is a program that is automatically transmitted from the USB device 1 to the USB host 2 upon completion of the initial detection process (e.g., after the above steps S10 and S20) whenever the USB device 1 is connected to the USB host 2. Thus, the first embodiment of the present application utilizes an auto-run program that is already transmitted between the USB device 1 and the USB host 2, and thus the original functions of the USB device 1 do not have to be significantly changed. That is, the auto-run program can be updated to include a program that enables the desired USB mode change. However, the USB mode change program 7 can be installed separately from the auto-run program according to a different embodiment of the present application.

Then, as shown in FIGS. 3 and 4, the USB host 2 loads and executes the received auto-run program including the mode change program 7 (S40). For example, the USB host 2 loads the auto-run program into its own memory and maintains the program in an active state. In addition, the term "loading" refers to a process in which a processor in the USB host 2 writes an instance of a specific program to a memory in order to execute the specific program.

Figure 13:
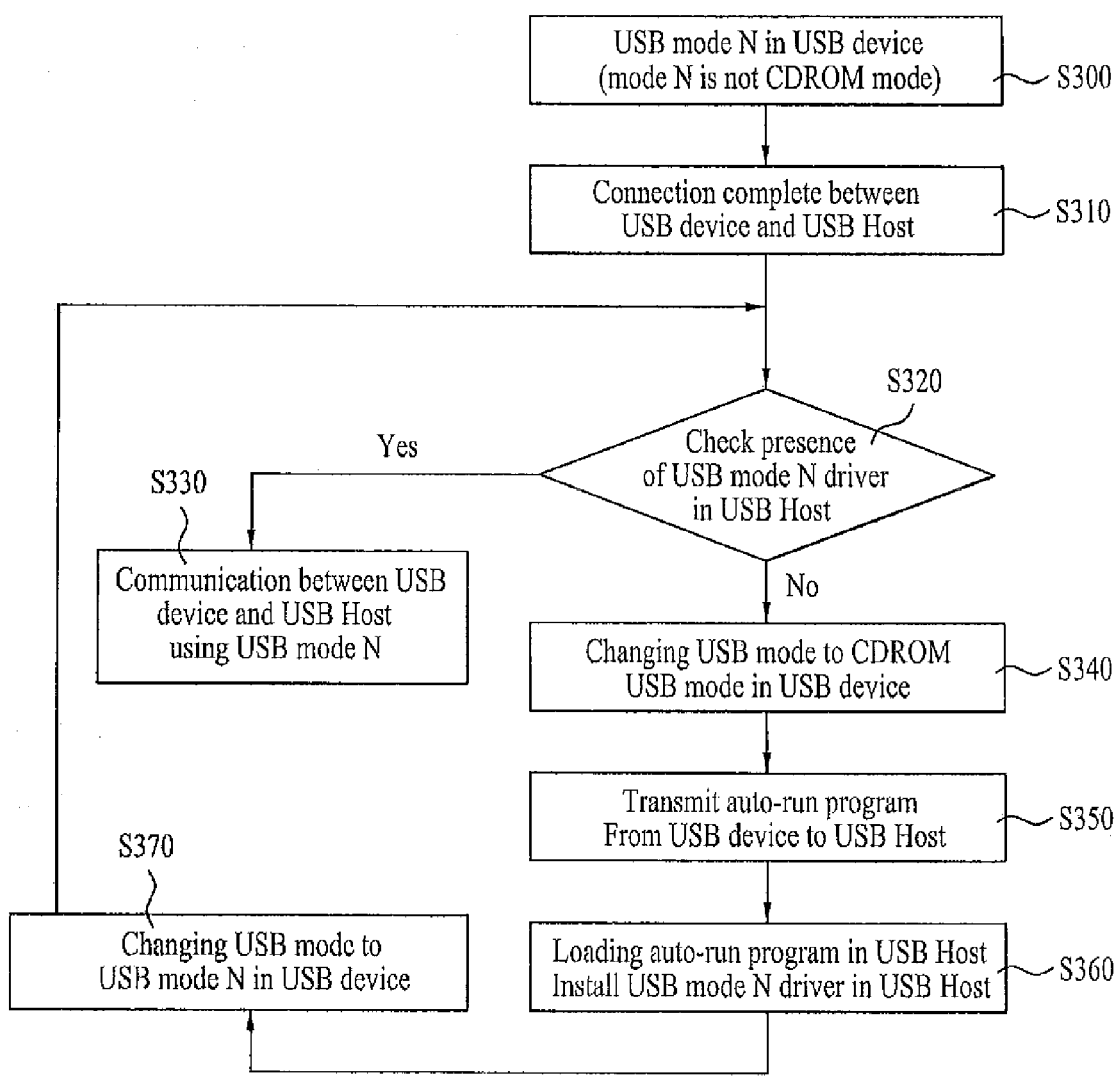
FIG. 13 is a flow chart illustrating a method of communicating between a USB device and a USB host according to a sixth embodiment of the present application.

After step S40, the USB host 2 transmits the USB mode change command 8 to the USB device 1 for changing the USB mode in the USB device 1 (S50). For example, and as discussed above with respect to FIG. 2, the USB mode change command 8 can change the initial USB mode A to the USB mode B. Further, the USB host 2 can issue the USB mode change command 8 automatically or at a request of the user. When the USB host 2 issues the USB mode change command 8 at the request of the user, the USB host 2 preferably displays available USB nodes to the user to allow the user to select a USB mode from the displayed modes. FIG. 13 illustrates one example of displaying such modes. In addition, when the USB host 2 issues the USB mode change command 8 automatically or according to a decision of the USB host 2, the USB host 2 uses the mode change program 7 that was included in the auto-run program.

Then, as shown in FIGS. 3 and 4, the USB device 1 changes the USB mode according to the USB mode change command 8 sent by the USB host (S60). For example, when the USB mode change command 8 is a command to change the operating mode to the USB mode B, the USB device 1 discards the USB mode A and sets the USB mode B as the new mode. In more detail, to apply the new USB mode B, the USB device 1 executes an internal program associated with operation of the USB mode B.

Next, FIGS. 5 to 9 illustrate another method for changing a USB mode between the USB device 1 and the USB host 2 according to a second embodiment of the present application. That is, the second embodiment relates to changing the operating mode from a CDROM USB mode (storage) to a CDC (Communication Device Class) USB mode (modem).

Figure 5:
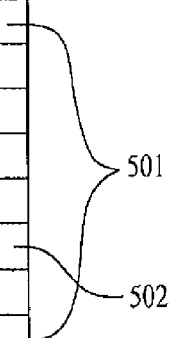
FIG. 5 is a USB class table illustrating USB classes according to a second embodiment of the present application.

In more detail, FIG. 5 is a table illustrating a variety of USB modes supported by the USB standard. The table shown in FIG. 5 is updated as appropriate by the USB standard committee. As shown in FIG. 5, the USB standard includes a variety of defined classes, which are associated with different USB modes (e.g., modem, storage, etc). For example, the classes of "02h" and "0Ah" identified by the reference numeral 501 in the USB standard in FIG. 5 are associated with a data communication mode (e.g., the CDC USB mode). In addition, the class of "08h" identified by the reference numeral 502 in the USB standard in FIG. 5 is associated with a data storage mode (e.g., the CDROM USB mode).

Thus, the USB standard (one example is shown in FIG. 5) defines a variety of USB classes according to different purposes of the USB device 1. Further, a USB device having a specific purpose has an activated USB class for the specific purpose, and a USB host that controls the USB device activates a USB class corresponding to the USB class of the USB device to perform data communication according to the USB standard. Because the functions of the USB host and the USB device are determined according to selection of the USB class, the selection of the USB class corresponds to the selection of the USB operating mode.

In addition, an application can use or operate in association with all or part of a plurality of USB classes required for the corresponding function. For example, an application of a USB modem uses the classes "02h" and "0Ah" identified by the reference numeral 501 shown in FIG. 5. In addition, an application of a USB storage device uses the class "08h" identified by the reference numeral 502 shown in FIG. 5. Thus, each USB mode according to embodiments of the present application corresponds to an application that operates in association with one or a plurality of classes for each corresponding function.

Figure 6:
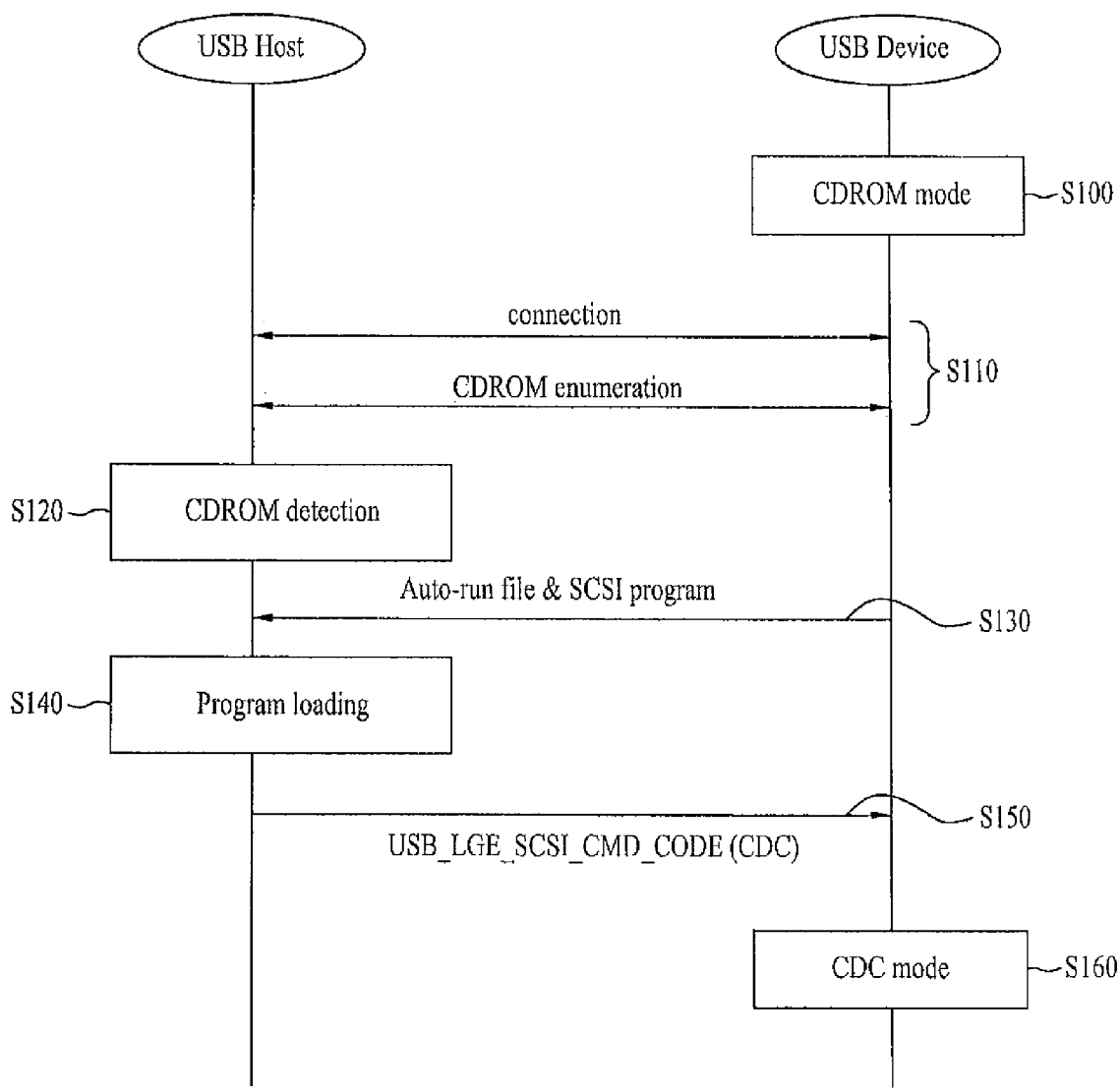
FIG. 6 is a process flow diagram illustrating communication between the USB device and the USB host according to the second embodiment of the present application.

Next, FIG. 6 is a process flow diagram illustrating the operations of the USB device 1 and the USB host 2 according to the second embodiment of the present application. In this embodiment, the operating mode of the USB device 1 is assumed to be initially set to the CDROM USB mode, which is used as a storage device (S100). Then, when the USB device 1 is connected to the USB host 2, the USB host 2 detects the mode of the USB device (S110). This process is referred to as a "CDROM enumeration" process. When the CDROM enumeration process has been completed, the USB host 2 confirms the mode of the USB device as the "CDROM mode" (S120).

After step S120, the USB device 1 transmits the mode change program 7 to the USB host 2 (S130). Further, this embodiment refers to the CDROM USB mode complying with the Small Computer System Interface (SCSI) standard, which is a standard serial interface for connection of peripheral devices to a computer. In more detail, the SCSI standard includes mechanical and electrical requirements for connection of input/output buses and includes a set of commands for peripheral devices. That is, in this embodiment, the USB device 1 transmits a SCSI program according to the SCSI standard to the USB host (S130).

Therefore, according to the second embodiment of the present application, the auto-run program corresponds to a SCSI program. Then, when the USB host 2 detects connection of the USB device 1, the USB host 2 executes a CD auto-run file (e.g., "autorun.inf") as an auto-run program stored in the USB device 1 and loads the SCSI program as the USB mode change program 7 (S140). In addition, at step S140, the USB host 2 can include or be installed with a program required for modem communication such as a modem driver.

Thereafter, the USB host 2 executes the USB mode change program 7 and transmits the USB mode change command 8 for changing the mode of the USB device 1 (S150). For example, the USB host 2 can transmit the USB mode change command 8 "USB_LGE_SCSI_CMD_CODE_(CDC)" to change the initial CDROM USB mode to the CDC USB mode. The USB host 2 can also issue and transmit the USB mode change command 8 through a SCSI program, which will be described in more detail below with reference to FIGS. 7 and 8.

Further, as discussed above, the USB mode change command 8 changes the initial USB mode A to the USB mode B. Also, the USB mode change command 8 can be issued at a request of the user or be automatically issued according to decision of the USB host 2. When the USB mode change command 8 is issued to change the USB mode at the request of the user, the USB host 2 can display available USB modes to the user to allow the user to select a USB mode from the displayed modes. When the USB mode change command 8 is issued to change the USB mode according to the decision of the USB host 2, the program for accomplishing this is included in the autorun.inf file and the USB host 2 executes the autorun.inf file and the SCSI program to issue and transmit to the USB device the command to automatically change the operating mode to a specific USB mode (e.g., the CDC USB mode) specified by the program.

Figures 7, 8:
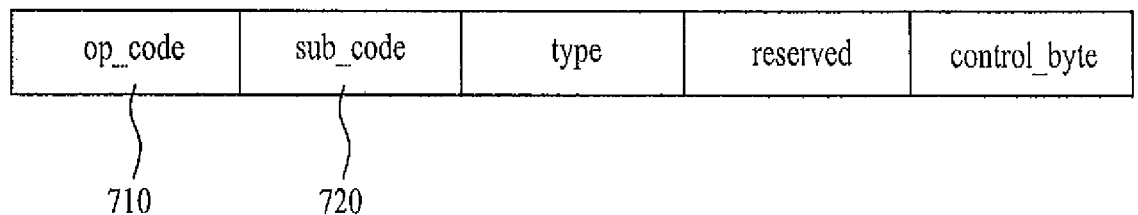
FIG. 7 illustrates a SCSI command format according to the second embodiment of the present application.
FIG. 8 illustrates an example of SCSI commands according to the second embodiment of the present application.

Next, FIGS. 7 and 8 illustrate a mode change command format in the SCSI standard according to the second embodiment of the present application. In more detail, a SCSI command is used to control a large-capacity auxiliary storage device such as a hard disk, a CD, or a DVD. For the USB standard, the USB mode (e.g., the UMS or CD-UMS class "08h" in FIG. 5) corresponding to a large-capacity storage device supports the SCSI command.

Further, as shown in FIG. 7, according to the SCSI standard, the SCSI command includes an op_code 710 and a sub_code 720. Thus, according to embodiments of the present application, the variety of SCSI commands described above is defined in the op_code 710 and the sub_code 720. Also, the USB mode change command 8 associated with the second embodiment of the present application is preferably defined in the op_code 710 and the sub_code 720. However, the USB mode change command 8 can be defined in another region of the SCSI command format. For example, according to the SCSI standard, some regions (e.g., regions of 60h to FFh) in the op_code 710 are set as reserved regions that can be arbitrarily used by manufacturers. Accordingly, when the USB mode change command 8 is transmitted using the regions 60h to FFh in the op_code 710, each manufacturer can easily define and use the USB mode change command 8 while maintaining compatibility with the existing SCSI standard.

In addition, the SCSI standard reserves some regions of the SCSI command for device manufacturers. Therefore, one embodiment of the present application uses the reserved regions to instruct the USB device 1 to change the USB class activated in the USB device 1. This allows the USB host 2 to remotely change the operating mode of the USB device 1. Further, the USB device 1 according to embodiments of the present application is able to operate in two or more USB operating modes and able to be set to an operating mode supporting the SCSI command. The USB host 2 can then transmit a specific SCSI command, which uses a reserved region defined in the SCSI standard, to the USB device 1.

FIG. 8 is a table illustrating examples of the USB mode change command according to an embodiment of the present application. As shown, the table includes three specific SCSI commands 810, 820 and 830 used to change the USB mode of the USB device 1. For example, when the USB host 2 decides to change the operating mode of the USB device 1 to a wireless modem mode according to a result of the execution of a specific program (for example, the CD autorun.inf file) or according to user input, the USB host 2 transmits the CHANGE_TO_CDC command 810 shown in FIG. 8 to the USB device 1. Upon receiving the CHANGE_TO_CDC command 810, the USB device 1 loads an application which uses a CDC class supporting a wireless modem function. For example, the USB device 1 can delete an application using an existing CD-UMS class from a main memory or run the application loaded in a standby mode via multitasking.

Figure 9:
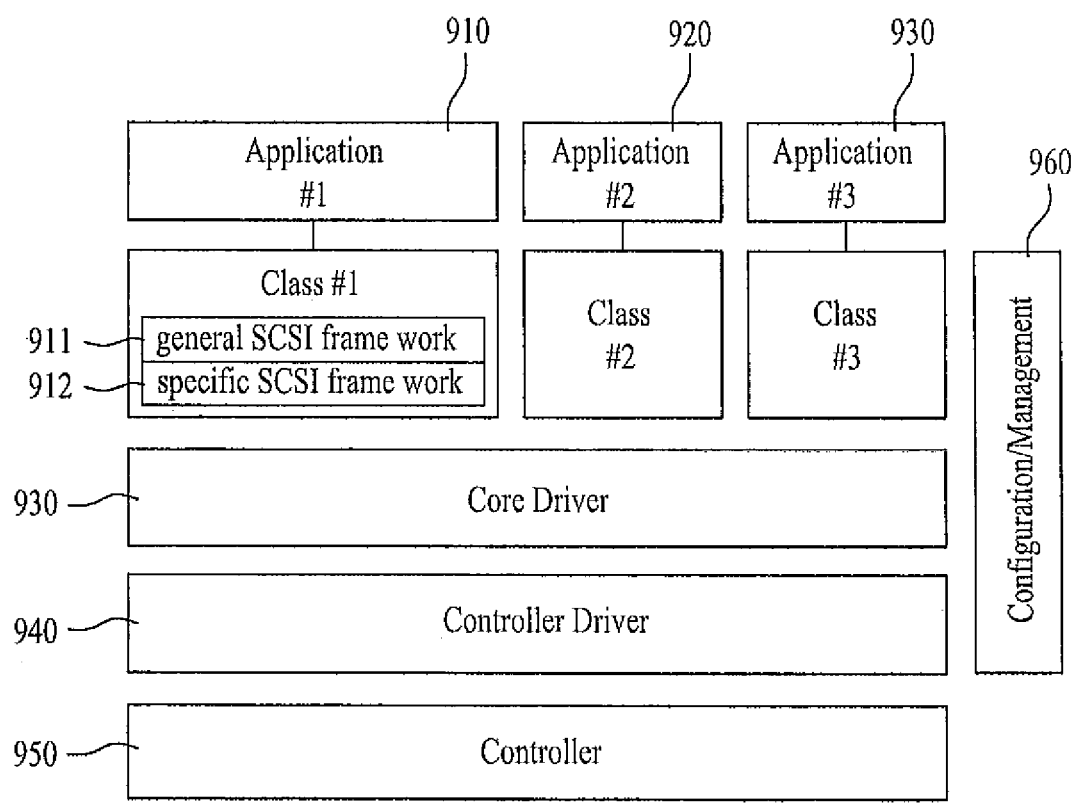
FIG. 9 illustrates a software hierarchy of a USB device according to the second embodiment of the present application.

Next, FIG. 9 is an overview illustrating a USB hierarchy implemented in a USB device according to the second embodiment of the present application. As shown, a USB class layer is defined above a USB core driver layer 930. Further, application layers 910, 920 and 930 using respective USB classes are defined above the respective USB class layers. In addition, for a USB class supporting a large-capacity storage device such as a UMS or a CD-UMS, a corresponding USB class layer includes a general SCSI framework 911 for performing the appropriate SCSI command. Also, a specific SCSI framework 912 for performing the appropriate SCSI command is also included in the class layer. The specific framework 912 can also be included in the application layer 910, 920 or 930.

In addition, with reference to the USB hierarchy model, the SCSI command received from an external USB host is input to the general SCSI framework 911. The general SCSI framework 911 then performs a corresponding process if the received SCSI command is a general SCSI command or transfers the received SCSI command to the specific SCSI framework 912 if the received SCSI command is not a general SCSI command. Further, if the SCSI command received by the specific SCSI framework 912 is a specific SCSI command specified by a manufacturer, the specific SCSI framework 912 performs a process that the manufacturer has defined for the command.

Then, upon receiving the specific SCSI command instructing the corresponding USB class change, the specific SCSI framework 912 activates an operation for changing the activated USB class. In addition, the USB class change operation can be performed by an operating system of the USB device and/or by changing a corresponding application.

Figure 10:
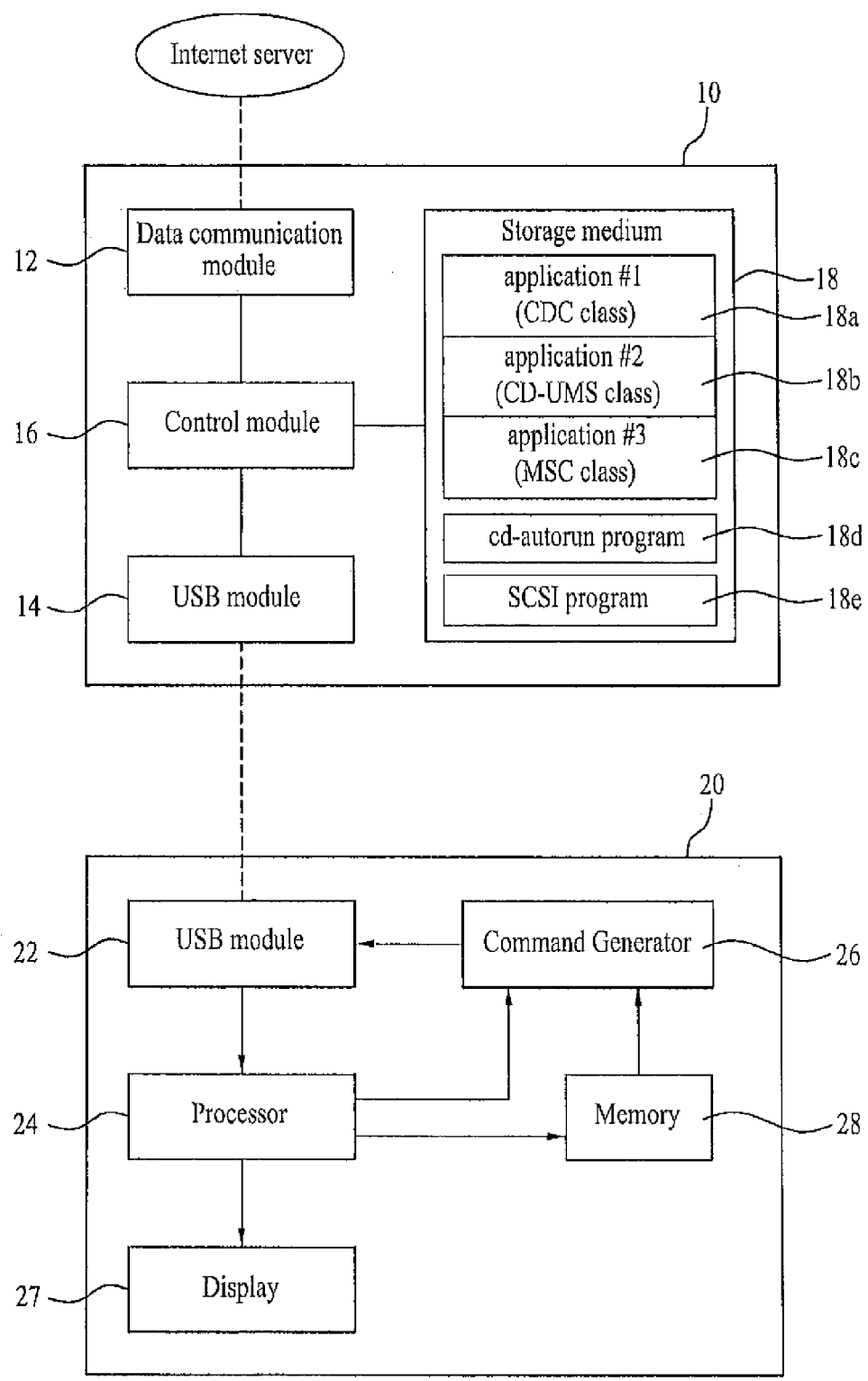
FIG. 10 is a block diagram of a USB modem device according to a third embodiment of the present application.

Next, FIG. 10 is a block diagram of a USB device 10 and a USB host 20 according to a third embodiment of the present application. In this third embodiment, the USB device 10 can be used as a USB modem and a storage device. As shown, the USB device 10 includes a data communication module 12, a storage medium 18, a USB module 14 and a control module 16. Further, the data communication module 12 is connected to a wired or wireless communication network to perform data communication.

In addition, the storage medium 18 stores at least two programs corresponding to different USB classes. In FIG. 10, the storage medium 18 stores three programs 18a, 18b and 18c that use different USB classes. The storage medium 19 also stores an autorun program 18d and a SCSI program 18e. The USB module 14 performs data communication with an external USB host, and the control module 16 executes programs that use the USB classes.

In addition, the USB device 10 transfers data received from the USB host 20 through the USB module 14 to an external server or terminal computer connected to the communication network through the data communication module 12 and also transfers data received from the external server to the USB host 20 through an opposite path. Also, as a small computing device, the USB device 10 may include a central processing unit, a main memory, and an auxiliary memory. Further, the storage medium 18 may also include an auxiliary memory of the USB device 10 such as a flash memory or a disc medium.

Also, the USB device 10 may form the USB hierarchy as shown in FIG. 9 using the storage medium 18 and may include a general/specific SCSI framework as a SCSI module for executing general and specific SCSI commands. In addition, the control module 16 controls the overall operations of the USB device 10. Also, the control module 16 initially loads a program that uses a class of "CD-UMS" for handling the USB device 10 as a CD-ROM.

Then, when the control module 16 receives an instruction to change a class or a USB mode to a desired class from the USB host 20, the control module 16 loads a program that uses the desired class. In addition, the autorun program preferably has an autorun file format and/or name of a CD-ROM and the SCSI program corresponds to a program that outputs the specific SCSI command described above.

In addition, the USB host 20 includes a USB module 22, a processor 24 and a memory 28. The USB module 22 performs data communication with the USB device 10 connected to the USB host 20, and the processor 24 processes data received from the USB device 10 and controls the overall operations of the USB host 20. Further, the memory 28 temporarily or permanently stores relevant programs and data.

Also, the USB host 20 includes a command generator 26 that generates a USB mode change command to change the USB mode of the USB device 10. In addition, the processor 24 and the command generator 26 may be combined into a single unit. The USB host 20 also includes a display 27 to provide currently available USB modes in the USB device 10 to the user when the USB mode of the USB device 10 is changed. Thus, the user can select a specific USB mode based on information provided through the display 27.

Further, when a specific USB mode has already been set in the cd-autorun program 18d and the SCSI program 18e, the system can automatically change the USB mode without the user's selection through the display 27 as described above. The USB mode change operations are similar to the operations described in the second embodiment.

Figure 11:
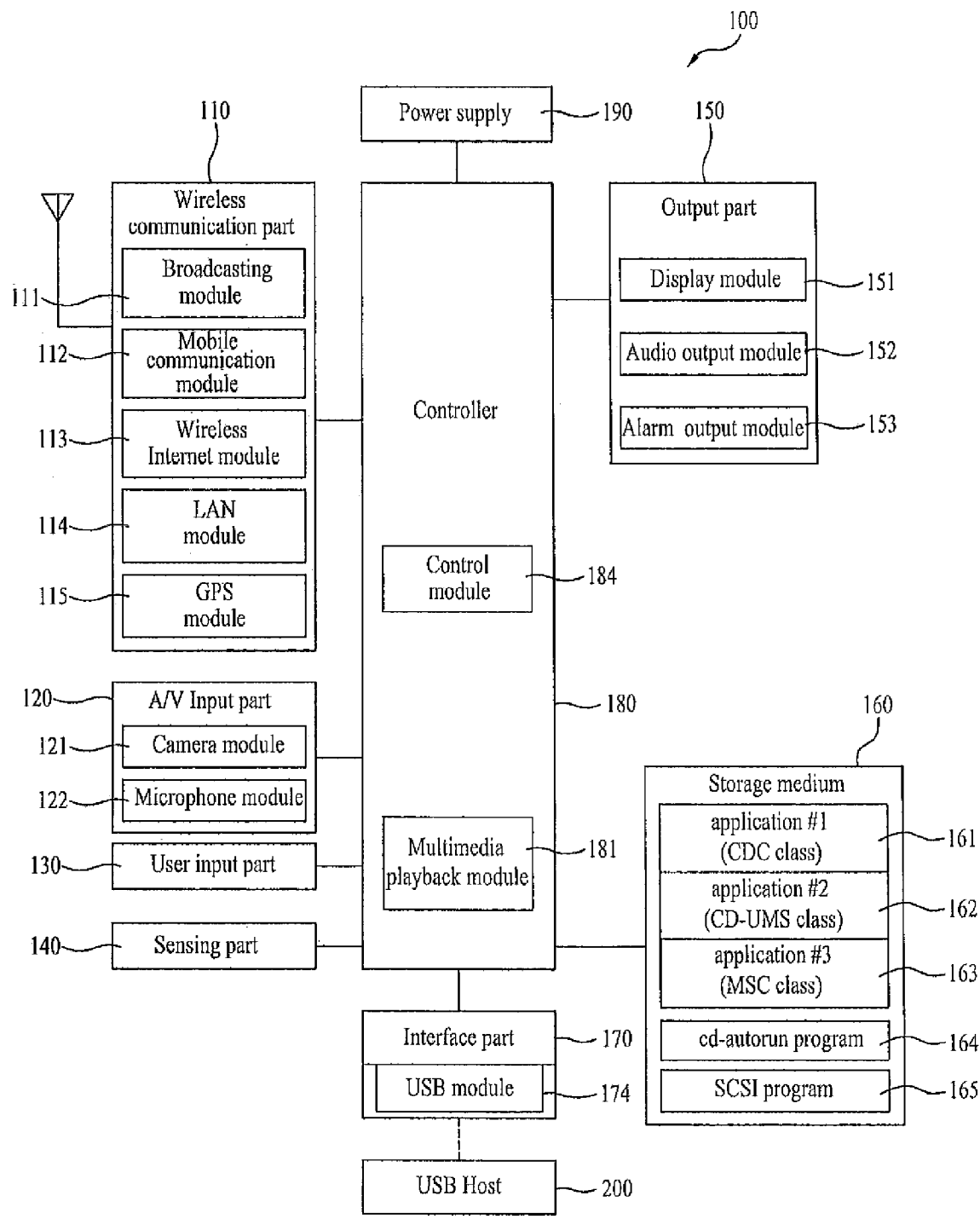
FIG. 11 is a block diagram illustrating a mobile terminal that also functions as a USB modem device according to a fourth embodiment of the present application.

Next, FIG. 11 is a block diagram of a USB device 100 according to a fourth embodiment of the present application when the USB device 100 is connected to a USB host 200. In this embodiment, the USB device 100 is a mobile terminal such as a mobile phone, a smart phone, a notebook computer, a receiver for digital broadcasting data, a Personal Digital Assistant (PDA), a Portable Multimedia Player (PMP), or a navigator. The mobile terminal 100 is also connected to a USB host 200. In addition, the mobile terminal 100 can be connected to a wireless communication network and a Content Provider (CP) server that provides a variety of Internet services through the wireless communication network.

As shown in FIG. 11, the mobile terminal 100 includes a wireless communication part 110, an Audio/Video (AV) input part 120, a user input part 130, a sensing part 140, an output part 150, a storage medium 160, an interface part 170, a controller 180 and a power supply 190. Further, two or more of these components may be combined into a single component or one component may be divided into two or more components as needed.

As shown, the mobile terminal 100 includes a wireless communication unit 110 having one or more components which permits wireless communication between the mobile terminal 100 and a wireless communication system or network within which the mobile terminal is located. For example, the wireless communication unit 110 includes a broadcast receiving module 111 that receives a broadcast signal and/or broadcast associated information from an external broadcast managing entity via a broadcast channel. The broadcast channel may include a satellite channel and a terrestrial channel.

In addition, the broadcast managing entity generally refers to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of the digital multimedia broadcasting (DMB) system and electronic service guide (ESG) of the digital video broadcast-handheld (DVB-H) system.

In addition, the broadcast signal may be implemented as a TV broadcast signal, a radio broadcast signal, and a data broadcast signal, among others. The broadcast signal may further include a broadcast signal combined with a TV or radio broadcast signal. The broadcast receiving module 111 is also configured to receive broadcast signals transmitted from various types of broadcast systems. For example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system among others. Receiving multicast signals is also possible. Further, data received by the broadcast receiving module 111 may be stored in a suitable device, such as a memory 160.

The wireless communication unit 110 also includes a mobile communication module 112 that transmits/receives wireless signals to/from one or more network entities (e.g., base station, Node-B). Such signals may represent audio, video, multimedia, control signaling, and data, among others. Also included is a wireless Internet module 113 that supports Internet access for the mobile terminal. The module 113 may be internally or externally coupled to the terminal. The wireless communication unit 110 also includes a short-range communication module 114 that facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location GPS module 115 is also included in the wireless communication unit 110 and identifies or otherwise obtains the location of the mobile terminal 100. The position-location module 115 may be implemented using global positioning system (GPS) components which cooperate with associated satellites, network components, and combinations thereof.

In addition, as shown in FIG. 1, the mobile terminal 100 also includes an Audio/video (A/V) input unit 120 that provides audio or video signals to the mobile terminal 100. As shown, the A/V input unit 120 includes a camera 121 and a microphone 122. The camera 121 receives and processes image frames of still pictures or video.

Further, the microphone 122 receives an external audio signal while the portable device is in a particular mode, such as a phone call mode, recording mode and voice recognition mode. The received audio signal is then processed and converted into digital data. Also, the portable device, and in particular, the A/V input unit 120, generally includes assorted noise removing algorithms to remove noise generated in the course of receiving the external audio signal. In addition, data generated by the A/V input unit 120 may be stored in the memory 160, utilized by an output unit 150, or transmitted via one, or more modules of the communication unit 110. If desired, two or more microphones and/or cameras may be used.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display, which will be described in more detail below.

A sensing unit 140 is also included in the mobile terminal 100 and provides status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, etc.

As an example, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply 190, the presence or absence of a coupling or other connection between an interface unit 170 and an external device, etc.

Further, the interface unit 170 is often implemented to couple the mobile terminal 100 with external devices. Typical external devices include wired/wireless headphones, external chargers, power supplies, storage devices configured to store data (e.g., audio, video, pictures, etc.), earphones, and microphones, among others. In addition, the interface unit 170 may be configured using a wired/wireless data port, a card socket (e.g., for coupling to a memory card, a subscriber identity module (SIM) card, a user identity module (UIM) card, a removable user identity module (RUIM) card, etc.), audio input/output ports and video input/output ports.

The output unit 150 generally includes various components which support the output requirements of the mobile terminal 100. The mobile terminal 100 also includes a display module 151 (hereinafter referred to as the display 151) that visually displays information associated with the mobile terminal 100. For instance, if the mobile terminal 100 is operating in a phone call mode, the display 151 will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

Further, the display 151 also preferably includes a touch screen working in cooperation with an input device, such as a touchpad. This configuration permits the display 151 to function both as an output device and an input device. In addition, the display 151 may be implemented using display technologies including, for example, a liquid crystal display (LCD), a thin film transistor-liquid crystal display (TFT-LCD), an organic light-emitting diode display (OLED), a flexible display and a three-dimensional display.

The mobile terminal 100 may also include one or more of such displays. An example of a two-display embodiment is one in which one display is configured as an internal display (viewable when the terminal is in an opened position) and a second display configured as an external display (viewable in both the open and closed positions). FIG. 1 further shows the output unit 150 having an audio output module 152 which supports the audio output requirements of the mobile terminal 100.

The audio output module 152 is often implemented using one or more speakers, buzzers, other audio producing devices, and combinations thereof. Further, the audio output module 152 functions in various modes including a call-receiving mode, a call-placing mode, a recording mode, a voice recognition mode and a broadcast reception mode. During operation, the audio output module 152 outputs audio relating to a particular function (e.g., call received, message received, and errors).

In addition, the output unit 150 is further shown having an alarm 153, which is used to signal or otherwise identify the occurrence of a particular event associated with the mobile terminal 100. Typical events include a call received, a message received and user input received. An example of such output includes the providing of tactile sensations (e.g., vibration) to a user. For instance, the alarm 153 may be configured to vibrate responsive to the mobile terminal 100 receiving a call or message.

As another example, a vibration is provided by the alarm 153 responsive to receiving user input at the mobile terminal 100, thus providing a tactile feedback mechanism. Further, the various outputs provided by the components of the output unit 150 may be separately performed, or such output may be performed using any combination of such components.

In addition, the memory 160 is generally used to store various types of data to support the processing, control, and storage requirements of the mobile terminal 100. Examples of such data include program instructions for applications operating on the mobile terminal 100, call history, contact data, phonebook data, messages, pictures, video, etc.

Further, the memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The terminal 100 also includes a controller 180 that generally controls the overall operations of the mobile terminal 100. For instance, the controller 180 performs the control and processing associated with voice calls, data communications, instant message communications, video calls, camera operations and recording operations. As shown in FIG. 1, the controller 180 also includes a multimedia module 181 for providing multimedia playback functions. The multimedia module 181 may be configured as part of the controller 180, or may be implemented as a separate component. In addition, a power supply 190 provides power used by the various components for the portable device. The provided power may be internal power, external power, or combinations thereof.

Further, the controller 180 also identifies an action of an object (e.g., a finger of the user) touching (directly or near) the touch screen and changes the size or region of a screen displayed on the touch screen. To accomplish this, the controller 180 may form a scrollbar or a mini map for controlling the size or region of the screen displayed on the touch screen.

Reference will now be made to the method for changing the USB mode through the mobile terminal 100 of FIG. 11 according to an embodiment of the present application. In this embodiment, the wireless Internet module 113 included in the wireless communication part 110 serves as a data communication module that performs data communication with an external Internet server.

Further, as shown in FIG. 11, a USB module 174 is implemented as a part of the interface part 170 that supports connection of the mobile terminal 100 to another device. In addition, the storage medium 160 contains programs 161, 162 and 163, which use different USB classes, an autorun program 164 and a SCSI program 165. Thus, when the mobile terminal 100 is connected to a USB port of the USB host 200 (e.g., an external PC), the USB host 200 can perform a process for automatically recognizing and setting the mobile terminal 100 as a USB wireless modem. This process is performed using a program stored in the storage medium 160 and is similar to that of the embodiments described above.

Figure 12:
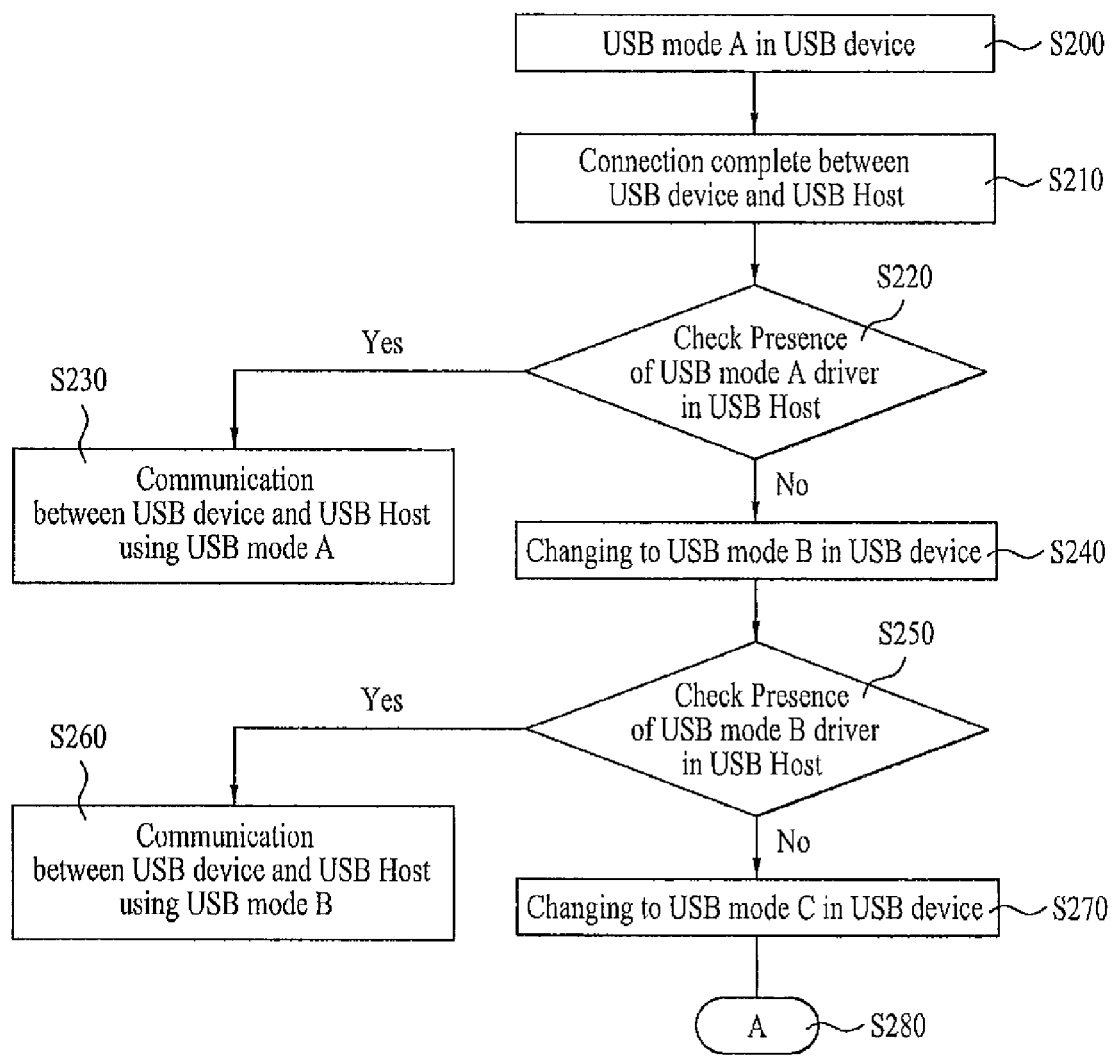
FIG. 12 is a flow chart illustrating a method of communicating between a USB device and a USB host according to a fifth embodiment of the present application.

Next, FIG. 12 is a flow chart illustrating an operation of a USB device and a USB host according to a fifth embodiment of the present application. This embodiment also assumes the USB device has been set to a USE mode A before the USB device is connected to the USB host (S200). Then, when the USB device is connected to the USB host, the USB host checks the connection of the USB device through the "enumeration" process (S210).

After step S210, the USB device checks whether or not the USB host includes a driver or a driver program that can support the USB mode A (S220). If the USB host includes a driver corresponding to the USB mode A (Yes in S220), the USB device and the USB host are allowed to exchange data with each other through the USB mode A (S230). On the other hand, if the USB host does not include a driver corresponding to the USB mode A (No in S220), the USB device changes the USB mode of the device from the mode A to the USB mode B (S240).

After step S240, the USB device repeats similar processes as those in the above steps S220, S230 and S240 for the USB mode B driver (S250, S260 and S270). Further, if the USB host fails to find a USB mode supported by the USB host (No in S250), a driver of a desired USB mode may be automatically installed in the USB host (S280).

Further, in steps S220 and S250, the USB device can use the following method to check whether or not the USB host includes a driver corresponding to the USB mode set in the USB device. That is, the USB device transmits information regarding the USB mode set in the device to the USB host. For example, the USB device implements transmission of such information by transmitting corresponding USB mode information to the USB host after receiving a specific command (e.g., "get descriptor_request") from the USB host.

Upon receiving the USB mode information, the USB host transmits a specific recognition signal to the USB device if the USB host is able to support the corresponding USB mode. For example, a set_configuration request may be defined and used as the recognition signal. That is, when the USB device has received the set_configuration request from the USB host, the USB device determines that the USB host is able to support the USB mode set in the device. The USB device may also preset a specific time (e.g., 2 seconds) and determine that the set_configuration request has not been received if the set_configuration request is not received within the specific time.

Next, FIG. 13 is a flow chart illustrating the operations of a USB device and a USB host according to a sixth embodiment of the present application. This embodiment assumes the USB device has been set to a USB mode N before the USB device is connected to the USB host (S300). Further, the USB mode N is assumed to be a USB mode other than the CDROM mode (e.g., CDC mode or MTP mode).

Then, when the USB device is connected to the USB host, the USB host checks the connection of the USB device through the "enumeration" process (S310). After step S310, the USB device checks whether or not the USB host includes a driver that can support the USB mode N (S320). This step S320 may be implemented through the same operations as those of the above step S220 of the fifth embodiment.

If the USB host includes a driver corresponding to the USB mode N (Yes in S320), the USB device and the USB host are allowed to exchange data with each other through the USB mode N (S330). On the other hand, if the USB host does not include a driver corresponding to the USB mode N (No in S320), the USB device changes the USB mode of the USB device from the USB mode N to the CDROM mode (S340). That is, the USB device changes the USB mode to the CDROM mode because most USB hosts support the CDROM mode, and because an autorun program described below can be used in the CDROM mode as in the second embodiment. However, the CDROM mode is only an example and if another USB mode that the USB host generally supports is present, the use of the USB mode is also included in the embodiment of the present application.

After step S340, the USB device transmits an autorun program that can be used in the CDROM mode to the USB host (S350). Upon receiving the autorun program, the USB host loads or installs the autorun program so as to load or install a driver that can support the USB mode N in the USB host (S360). Thereafter, the USB device changes the USB mode of the device back to the USB mode N (S370) and then repeats the above step S320 to check whether or not a driver that can support the USB mode N is present in the USB host.

Figure 14:
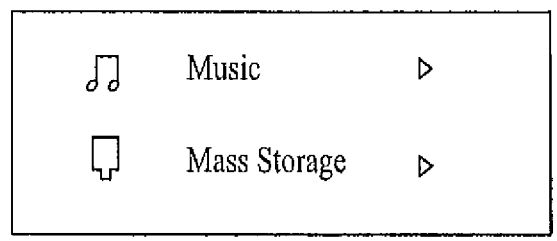
FIG. 14 is an overview of a display screen displaying options for selecting the second communication mode to be used for communication between the mobile terminal and the personal computer.

Next, FIG. 14 is an overview of a display screen displaying options for selecting the second communication mode to be used for communication between the mobile terminal and the personal computer. This information can be displayed on a display of the mobile terminal or can be displayed on a display of the personal computer. As shown in FIG. 12, the user can then select a communication mode for Music or for mass storage. Thus, the user can selectively select what communication mode they prefer to use. The information shown in FIG. 12 is also automatically displayed once the mobile terminal is connected to the personal computer without user intervention.

In addition, the different communication modes described above include one of a mass storage mode, an Media Transfer Protocol (MTP) mode (music mode), a video mode, and an Object Exchange (OBEX) mode such as the APPLE OBEX mode.

Further, the embodiments of present application can be applied to a variety of communication devices including a communication module (e.g., a USB module, IEEE1394 module, and Bluetooth module). The embodiments of the present application are also particularly advantageous because the communication mode of the communication device can be efficiently changed in various manners and the efficient use of the communication device is increased.

It will be apparent to those skilled in the art that various modifications and variations can be made in the present application without departing from the spirit or scope of the applications. Thus, it is intended that the present application covers the modifications and variations of this application provided they come within the scope of the appended claims and their equivalents.

What is claimed is:

1. A mobile terminal, comprising:
an interface module configured to connect the mobile terminal, corresponding to a Universal Serial Bus (USB) client, to a personal computer;
a communication unit configured to provide internet access; and
a controller configured to:
initially set the mobile terminal as a first communication mode, and
selectively transmit a driver compatible with the first communication mode to the personal computer via the interface module,
wherein unless the driver compatible with the first communication mode is installed on the personal computer when the mobile terminal is connected to the personal computer, the controller is further configured to:
change a communication mode of the mobile terminal from the first communication mode to a second communication mode, and
transmit an auto-run program to the personal computer in order for the personal computer to install the driver for the first communication mode,
wherein if the driver for the first communication mode is installed on the personal computer completely, the controller is further configured to control the communication mode of the mobile terminal to be returned back to the first communication mode from the second communication mode, and
wherein the first communication mode includes at least one of a Media Transfer Protocol (MTP) mode, a video mode, an Object Exchange (OBEX) mode or a Communication Device Class (CDC) USB mode and the second communication mode includes at least one of a mass storage mode or a Compact Disk Read Only Memory (CDROM) USB mode.

2. The mobile terminal of claim 1, wherein the controller is further configured to selectively transmit a communication mode change program to the personal computer via the interface module,
wherein unless the communication mode change program is installed on the personal computer when the mobile terminal is connected to the personal computer, the controller is further configured to:
change a communication mode of the mobile terminal from the first communication mode to the second communication mode, and
transmit the communication mode change program to the personal computer, and
wherein a mode change command to change the communication mode of the mobile terminal is generated based on the communication mode change program installed on the personal computer.

3. The mobile terminal of claim 2, wherein the mode change command is generated automatically when the personal computer finds a new available network.

4. The mobile terminal of claim 2, wherein the mode change command is generated automatically at a scheduled time.

5. A personal computer, comprising:
an interface module configured to connect the personal computer to a mobile terminal corresponding to an USB (Universal Serial Bus) client;
a receiving unit configured to selectively receive a driver compatible with the first communication mode of the mobile terminal from the mobile terminal; and a controller configured to selectively receive a driver from the mobile terminal,
wherein unless the driver is installed on the personal computer when the mobile terminal is connected to the personal computer, the controller is further configured to:
send a request to the mobile terminal in a first communication mode to change a communication mode from the first communication mode to the second communication mode;
receive an auto-run program from the mobile terminal when the mobile terminal changes the communication mode from the first communication mode to the second communication mode;
install the driver compatible with the first communication mode by executing the auto-run program; and
send a request to the mobile terminal in the second communication mode to return back to the first communication mode when the driver for the first communication mode is installed completely, and wherein the first communication mode includes at least one of an Media Transfer Protocol (MTP) mode, a video mode, an Object Exchange (OBEX) mode or a Communication Device Class (CDC) USB mode and the second communication mode includes at least one of a mass storage mode or a Compact Disk Read Only Memory (CDROM) USB mode.

6. The personal computer of claim 5, wherein the controller is further configured to selectively receive a communication mode change program from the mobile terminal, wherein unless the communication mode change program is installed on the personal computer when the mobile terminal is connected to the personal computer, the controller is further configured to:

send the request to the mobile terminal to change the communication mode from the first communication mode to the second communication mode, and receive the communication mode change program from the mobile terminal, and wherein the mode change command to change the communication mode of the mobile terminal is generated based on the communication mode change program installed on the personal computer.

7. The personal computer of claim 6, wherein the mode change command is generated automatically when the personal computer finds a new available network.

8. The personal computer of claim 6, wherein the mode change command is generated automatically at a scheduled time.

9. A method of communication between a mobile terminal and a personal computer, the method comprising:

connecting the mobile terminal, initially set as a first communication mode and corresponding to a Universal Serial Bus (USB) client, to the personal computer; and wherein unless a driver compatible with the first communication mode is installed on the personal computer when the mobile terminal is connected to the personal computer, the method further comprises:

changing a communication mode of the mobile terminal from the first communication mode to a second communication mode, and transmitting an auto-run program to the personal computer in order for the personal computer to install the driver for the first communication mode, and wherein if the driver for the first communication mode is installed on the personal computer completely, the method further comprises returning back the communication mode of the mobile terminal from the second communication mode to the first communication mode, and wherein the first communication mode includes at least one of an Media Transfer Protocol (MTP) mode, a video mode, an Object Exchange (OBEX) mode or a Communication Device Class (CDC) USB mode and the second communication mode includes at least one of a mass storage mode or a Compact Disk Read Only Memory (CDROM) USB mode.

10. The method of claim 9, wherein unless the communication mode change program is installed on the personal computer when the mobile terminal is connected to the personal computer, the method further comprises:

changing the communication mode of the mobile terminal from the first communication mode to the second communication mode;

transmitting the communication mode change program to the personal computer, and wherein a mode change command to change the communication mode of the mobile terminal is generated based on the communication mode change program installed on the personal computer.

11. The method of claim 10, wherein the mode change command is generated automatically when the personal computer finds a new available network.

12. The method of claim 10, wherein the mode change command is generated automatically at a scheduled time.

* * * * *